Patented Aug. 14, 1923.

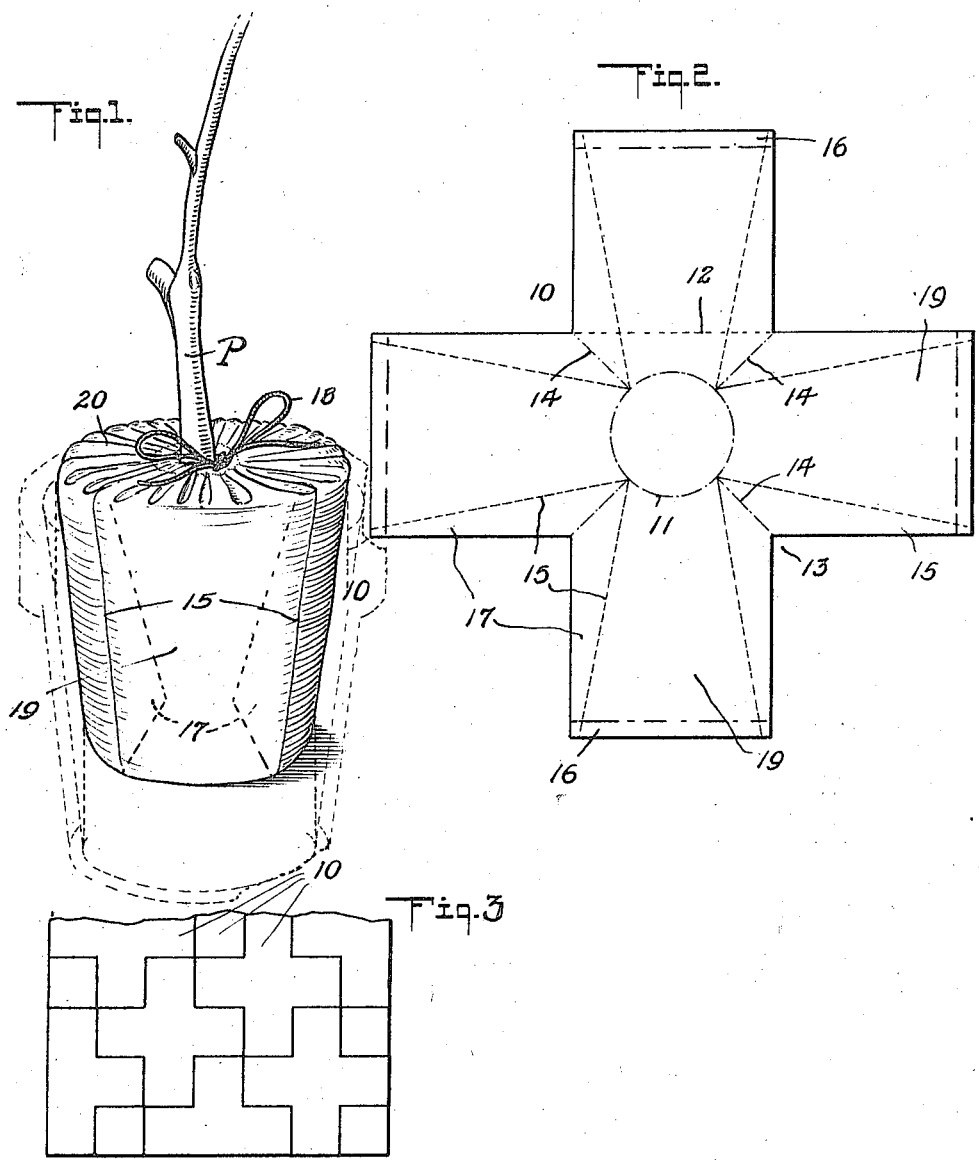

1,464,534

UNITED STATES PATENT OFFICE.

JOHN T. LOVETT, JR., OF LITTLE SILVER, NEW JERSEY.

PLANT-BALL SHIPPING CASE.

Application filed June 6, 1921, Serial No. 475,392. Renewed February 12, 1923.

*To all whom it may concern:*

Be it known that I, JOHN T. LOVETT, Jr., a citizen of the United States, residing at Little Silver, in the county of Monmouth and State of New Jersey, have invented certain new and useful Improvements in Plant-Ball Shipping Cases, of which the following is a specification.

This invention relates to horticultural appliances, and has particular reference to the handling or shipping of growing plants.

Among the objects of the invention is to provide a cheap, convenient, and reliable means for handling potted plants after removal thereof from the pots, so that the balls, or masses of dirt and roots, will be held not only intact but also in a suitable moist condition for a practically indefinite length of time.

Another object of the invention is to so equip the ball of a plant grown in a pot as to render it safe and easy to handle the plant without damage either to the plant or danger of loosening the dirt from the roots or bulbs.

Another object of the invention is to provide a case or cover for a plant ball that may be made of fabric or the like in the most economical manner not only as to the amount of material employed but also its method of cutting and making, and, moreover, with respect to its strength and durability in practice.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a diagrammatic perspective view of a plant ball showing my improvement thereon.

Fig. 2 is a plan view of the blank with dotted lines indicating the seam formations with respect to a ball formed in an ordinary tapered pot.

Fig. 3 is a diagram indicating the manner of cutting material without waste.

Referring now more specifically to the drawings I will describe the invention as applied to the balls of potted plants, and for the sake of illustration, but by no means as a limitation of the scope of the invention, I will refer to the use of my invention with respect to a five inch pot. A five inch pot has a diameter of five inches and is five inches high and the diameter of the bottom inside is about three inches. The ball of a plant grown in a pot of this size therefore is frusto conical in form having a bottom end about three inches in diameter and a height of about four inches, since the dirt reaches usually about to the level of one inch below the top of the pot.

The cases are cut as shown in Figs. 2 and 3 from a piece of material such as fabric without waste. The pattern 10 for each case is in the form of a cross and comprises five equal squares, and for a five inch case each of these squares measures approximately five inches so that the full length of the pattern each way is fifteen inches. I prefer to employ for the material a fabric possessing sufficient strength for the purpose and one that preferably will shrink when moistened. In other words, the case should be one that will slip freely over the ball and which after being tied and moistened will adapt itself snugly to the ball and even compress the same to a certain degree.

In the formation of the case to adapt it to the shape of the ball an imaginary circle 11 may be observed in the center of the central square of the pattern and having a diameter of about three inches, corresponding to the bottom end of the ball. Thus there will remain about one inch between the circumference of this circle and the imaginary lines 12 constituting the lines of connection between the outermost squares and said central square. From the circle 11 direct to the re-entrant angles 13 are diagonal lines 14, and from the inner end of each of these folding lines 14 are indicated seam lines 15 leading outward in pairs to the outer corners of the outside pairs on opposite sides of each re-entrant angle 13. The seam lines 15 are straight and when the re-entrant angle portions are folded inward and the line of stitches is run along each pair of seam lines 15 the pattern is made thus into a bag and then the periphery of the mouth of the bag is turned over forming a hem 16. The triangular angle portions 17 of the structure lie on the inside of the bag and are left uncut. A draw string 18 may be threaded through the hem or any other suitable fastening means may be employed for closing the case. It will be noted thus that each case comprises four tapered side panels 19 which extend all the way from the edge of the bottom inward along the sides of the ball and thence upward toward the center and reaching practically to the center or close around the stem of the plant P. Thus the case is fitted easily and relatively snugly around the entire ball preventing either the loosening or the loss of the dirt from the roots of the plants. After the case is applied in this manner it is plunged into water for a sufficient length of time to saturate the ball as much as is desired according to the nature of the plant or for the length of time it is desired for it to remain moist either for transportation or display purposes. As stated above the moistening of the case serves to cause it to shrink and compress the ball for a certain degree making it all the firmer and rendering it easier for handling and shipping the goods. In my experience with the use of these devices I have found that plants of the character indicated may be kept on sale in perfect condition for any desired length of time, additional moisture being easily applied thereto either by sprinkling or plunging when necessary. The triangular portions 17 on the inside of the case serve as containers for surplus moisture, and so without waste of material or trouble of trimming off such portions these parts of the strucutre serve a useful function.

Obviously the size and shape of the cases may vary according to the character of the balls and the nature of the stalk or stem portions of the plants so that in all cases the case will be fitted fairly closely to the ball when being applied and so that the draw string will bring the puckered portion of the case fairly close around the plant. Even though the cases may be cut and made cheaply and rapidly from any suitable material or fabric it is obvious that they may readily be removed from the balls when desired and may be used a number of times. Plant balls protected as indicated may be handled rapidly and easily and without any danger of injury thereto, the dirt being kept intact and in a suitably moist condition.

While in the practice of this invention I prefer in most instances to employ a shrinkable fabric for making the case so that when applied to the ball it will hug the same rather snugly, yet it will be understood that any other suitable material or fabric for the case may be employed. For instance, a fabric that is non-shrinkable or one that has been water-proofed in some way may be used to good advantage.

The dotted line illustration in connection with Fig. 1 indicates how the encased ball will conform approximately to the interior of an ordinary flower pot in which the ball may be presumed to have been formed.

I claim:

1. The herein described plant ball case composed of a plurality of sections, one in the center and the remainder extending outward from the center section, the external sections being seamed to one another along seam lines leading toward an imaginary circle around the center of the central section and of less diameter than any side of said central section.

2. The herein described blank for the making of a plant ball case, the same composed of a plurality of equal squares, one in the center and the remainder extending outward from the center square, the external squares being seamed to one another along seam lines leading toward an imaginary circle in the center of the central square and of less diameter than the side of the square.

3. The herein described blank for a plant ball case, the same comprising five equal squares, one in the center and four radiating outward from the sides of the central square, there being provided folding lines radiating outward directly from an imaginary circle formed centrally of the central square to the re-entrant angles between adjacent side squares, and adjacent sides of said squares being seamed together from their outer corners and on opposite sides of the folding line to the point of intersection between the folding line and said circle, forming four equal side panels in the finished case.

In testimony whereof I affix my signature.

JOHN T. LOVETT, JR.